United States Patent [19]

Jacobsen et al.

[11] Patent Number: 4,535,590
[45] Date of Patent: Aug. 20, 1985

[54] THERMAL SERVO-MOTOR, PARTICULARLY FOR VALVES

[75] Inventors: Finn Jacobsen, Nordborg; Jens J. Molbaek, Lavensby; Jan Zangenberg, Nordborg; Poul S. Dam, Ketting, all of Denmark

[73] Assignee: Danfoss A/S, Nordborg, Denmark

[21] Appl. No.: 594,977

[22] Filed: Mar. 29, 1984

[30] Foreign Application Priority Data

Apr. 18, 1983 [DE] Fed. Rep. of Germany ....... 3313999

[51] Int. Cl.$^3$ ............................................. F03C 5/00
[52] U.S. Cl. ...................... 60/531; 60/528; 251/11
[58] Field of Search ............ 60/528, 530, 531; 251/11, 61.4, 291

[56] References Cited

U.S. PATENT DOCUMENTS

| | | | |
|---|---|---|---|
| 2,322,762 | 6/1943 | Malone | 60/531 X |
| 2,379,124 | 6/1945 | Wasson | 251/11 |
| 3,173,245 | 3/1965 | Schutmaat | 251/11 X |
| 3,778,021 | 12/1973 | Alexander et al. | 60/531 X |

Primary Examiner—Stephen F. Husar
Attorney, Agent, or Firm—Wayne B. Easton

[57] ABSTRACT

The invention relates to a thermal servomotor which includes two operating elements particularly bellows boxes, which act oppositely on a valve actuating bridge. Each operating element has a temperature-dependent filling. Each operating element is connected to a relatively small container having a volume on the order of 0.2 cm$^3$ by a capillary passage which has the effect of partially thermally insulating each operating element from the associated container. Each container contains the medium of the filling that determines the pressure and separate heating apparatus is associated with each of the two containers.

15 Claims, 4 Drawing Figures

THERMAL SERVO-MOTOR, PARTICULARLY FOR VALVES

The invention relates to a thermal servo-motor, particularly for valves, comprising two operating elements, particularly bellows boxes, acting oppositely on an actuating bridge and each having a filling of temperature-dependent vapour pressure, and heating and/or cooling tempering apparatus for differently thermally influencing both fillings.

In a known thermal servo-motor (U.S. Pat. No. 2,989,281), two bellows boxes provided with a liquid-vapour filling act oppositely on a valve servo element. The bases of the two bellows boxes are fixed with respect to the housing with a thermo-electric heat pump interposed between them. The carrier consists of a thermally insulating material. The thermoelectric heat pump can be fed with an adjustable current selectively in the one or other direction by means of a change-over switch. This causes one bellows box to be cooled and the other heated. By reason of the temperature differences, different vapour pressures are obtained causing the valve to be either closed or opened.

Such a servo-motor has the advantage that it works substantially independently of the surrounding temperature because the influence of the surrounding temperature is substantially equal and opposite in both bellows boxes. However, the operating speed is slow, even if one goes to the upper limit of the currents normally permissible for such purposes. In addition, considerable electrical energy is required to maintain the bellows boxes at the desired temperature level.

The invention is based on the problem of providing a servo-motor of the aforementioned kind which, under the otherwise same conditions, is adjusted considerably more rapidly and/or can be operated with considerably less power.

This problem is solved according to the invention in that each operating element is connected to a container by way of an intermediate member which has a passage and which at least partially thermally insulates the operating element and container from each other, that the container contains the medium of the filling that determines the pressure, that the container space is small relatively to the smallest volume of the operating element, and that the tempering apparatus is associated with the two containers.

In this construction, the tempering apparatus need merely change the container temperature. Since the container is small compared with the operating element and a correspondingly low mass therefore needs to be heated or cooled, the temperature alterations take place rapidly and/or very little electrical energy is required to bring about the adjustment or to maintain a particular setting. Since the medium of the filling determining the pressure is disposed in the container, tempering of the container also determines the pressure in the operating element. In other respects, the function of the servo-motor remains unchanged. One can work at the same pressures as hitherto, the operating elements may have the same size, etc.

In a servo-motor with liquid-vapour fillings, the respective liquid filling should be less than the container space and the tempering apparatus should maintain the containers at a lower temperature than the operating elements. These two conditions ensure that the entire liquid will always be in the container and the vapour pressure is therefore a function of the container temperature.

Although the desired results are already obtained if the container is only half the size of the operating element, considerably smaller containers are preferred, e.g. with a size of less than 10% of that of the operating element, because the effects aimed at by the invention become more marked. In practice, containers have proved advantageous with a space less than 0.5 cm$^3$ and preferably only about 0.2 cm$^3$. With such small containers, the servo-motor reacts extraordinarily rapidly when energy is supplied to the tempering apparatus. The required power is extremely low. It is in the order of 0.25 to 0.5 W.

Desirably, the containers are subjected to the surrounding air. If the tempering apparatus is switched off, the container temperature will rapidly adapt to the surrounding temperature.

From a constructional point of view, it is advisable for the containers to be disposed on the outside of a housing surrounding one of the operating elements. This also permits small containers to be mounted.

Advantageously, the tempering apparatus comprises two electrical heaters each associated with a container and differently controllable. By operating the one or other heater, adjustment is produced in the one or other direction.

The tempering apparatus may also be a thermo-electric heat pump, e.g. a Peltier element with reversible operating direction, adapted to cool the one container and heat the other. Very small Peltier elements of correspondingly low power are sufficient for this purpose.

In a preferred embodiment with liquid-vapour fillings, both operating elements are electrically heatable. This permits the temperature of the containers to be simply kept at a low value despite the supply of heat, so that condensation will always take place in the container.

The electrical power required for such heating can be kept very low if both operating elements are surrounded by thermal insulation.

It is also sufficient for both operating elements to be associated with a common electrical heater. This is because it is no longer important to give the operating elements different temperatures. Instead, they may be at the same temperature.

In a preferred embodiment, each of the bellows boxes comprises an outer capsule and bellows disposed therein. The two capsules are combined to form a structural unit in which the capsule bases confront each other. This construction is possible because the capsules may have the same temperature. The pair of bellows boxes can be prefabricated as a unit and inserted in the servo-motor. In a very simple embodiment, the intermediate member is a capillary tube. This provides a lot of scope in arranging the container relatively to the associated operating element.

In another advantageous embodiment, the intermediate member is a block which is provided with a bore, consists of a material having a large thermal resistance, and carries the container. Since the operating element and container are one unit, they can be easily mounted.

Preferred examples of the invention will now be described in more detail with reference to the drawings, wherein.

Figure 1:
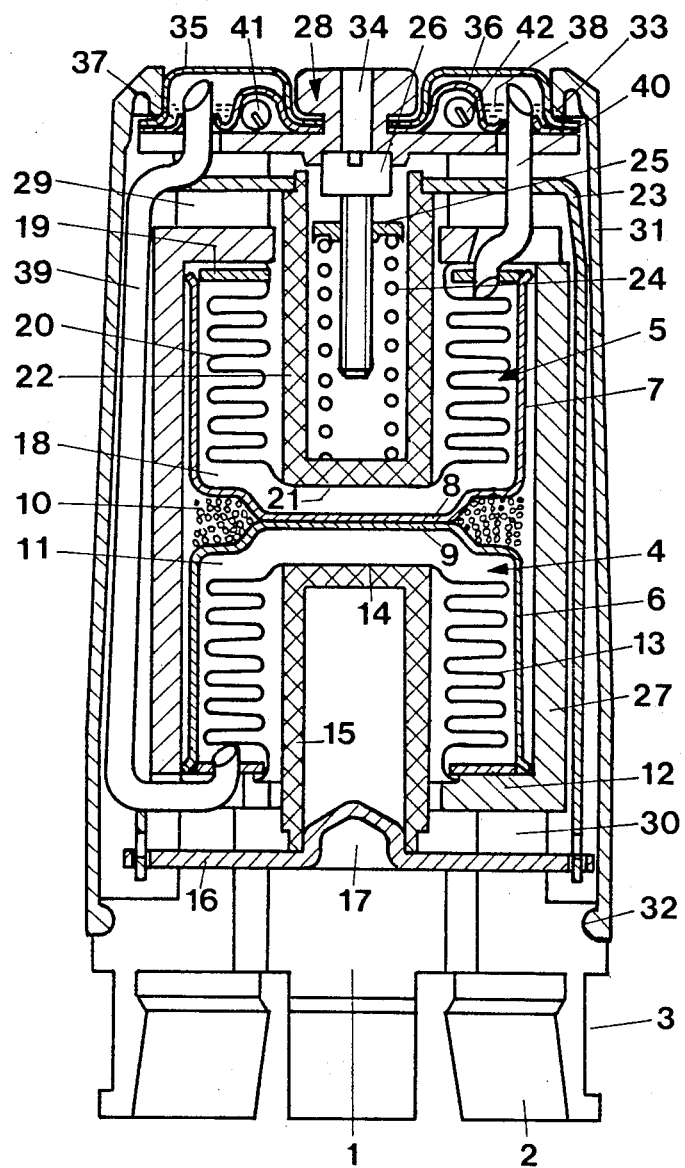
FIG. 1 is a longitudinal section through a servo-motor according to the invention.

The servo-motor of FIG. 1 comprises a base 1 which, similar to a thermostat attachment, can be placed on a valve housing. Resilient legs 2 are pushed over a bead of the valve housing and retained with the aid of a clamping band inserted in a circumferential groove 3.

Two operating elements 4 and 5 each comprise a capsule 6 or 7 of which the bases 8 and 9 are fixed to each other by spot welding. A common heating coil 10 is inserted between the two bases at the periphery. The interior 11 of the operating element 4 is bounded by the capsule 6, an annular flange 12 and resilient bellows 13 with end plate 14. The latter acts on a servo-plate 16 by way of a tappet 15 of thermally insulating material. The central depression 17 of the servo-plate is adapted to receive a pin actuating the closing member of the valve against the force of a return spring. The interior 18 of the operating element 5 is bounded by the capsule 7, an annular flange 19 and resilient bellows 20 with end plate 21. The latter acts on the end plate 16 by way of a tappet 22 of thermally insulating material and an actuating bridge 23. In addition, the tappet 22 is loaded by a desired value spring 24 supported on a plate 25 which is axially adjustable with the aid of a screw 26. Thermal insulation 27 surrounds the two operating elements 4 and 5.

An end cover 28 is connected by way of extensions 29 to the two operating elements 4 and 5 as well as the thermal insulation 27 to form a structural unit held against extensions 30 of the base 1. A cap 31 connected to the base 1 by a locking connection 32 holds the structural unit in situ with an inner flange 33. In this way, the screw 26 which is adjustable through a central aperture 34 is likewise held axially.

In the cover 28 there are two containers 35 and 36 each containing the liquid 37 or 38 of the liquid-vapour filling of the operating element 4 or 5, respectively. The fillings of both operating elements are the same. The container 35 is connected to the interior 11 of the operating element 4 by way of an intermediate 39 in the form of a capillary tube and the container 36 is connected to the interior 18 of the operating element 5 by way of an intermediate member in the form of a capillary tube 40. The container 35 is associated with an electric heating resistor 41 and the container 36 with an electric heating resistor 42.

If in an operating situation both operating elements 4 and 5 have the same temperature and therefore work with the same vapour pressure, a pressure equilibrium is obtained in which the servo-plate 16 and thus also the closing member of the actuated valve assume a neutral position. This is determined solely by the position-dependent false equilibrium, the resilient bellows 13 and the valve spring acting in the one direction and the resilient bellows 20 and the desired value spring 24 in the other direction.

If a temperature difference is created through different heating of the containers 35 and 36, for example because the heating resistor 41 heats the container 35 more intensely then the resistor 42 heats the container 36, a pressure difference is set up in the two operating elements 4 and 5 and hence a difference in the temperature-dependent forces. Accordingly, a change is set up in the position-dependent forces. The spindle is moved from the warmer to the cooler operating element.

The highest speed of motion is achieved if one operating element is heated whilst the other is cooled by the surrounding air. The position of the valve and its speed of movement can therefore be symmetrically controlled in the two directions about the neutral position in that the current in the heating resistors and thus the temperature in the containers 35 and 36 is controlled.

The interior of the containers 35 and 36 is only about 0.2 cm$^3$ each. The amount of liquid is still smaller. The vapour pressure can thus be rapidly changed and maintained with little heating power. The servo-motor reacts correspondingly fast. The smallest volumes of the operating elements 4 and 5 amounts to 5 cm$^3$. Accordingly, a heating power of 0.25 to 0.5 W will suffice for the heaters 41 and 42. Because of the insulation 27, a heating power of about 1 W is sufficient for the heating coil 10. Altogether, the temperature loading is low. Economical conventional thermoplastic materials can therefore be employed for the servo-motor. Electrical conductors may also have a small cross-section because the current is low.

Figure 2:
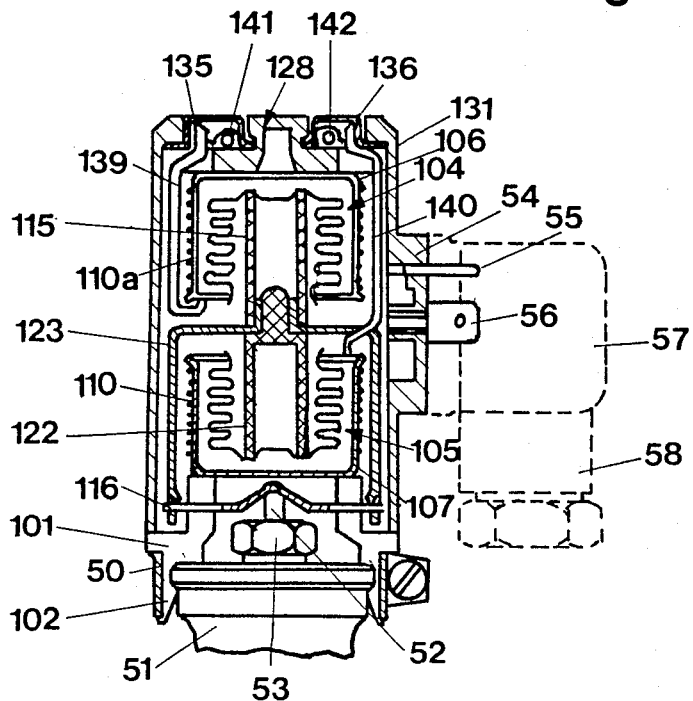
FIG. 2 is a longitudinal section through a modified embodiment.

In FIG. 2, corresponding integers to those in FIG. 1 are provided with reference numerals increased by 100. First, it will be seen how the resilient legs 102 of the base 101 are clamped by the band 50 onto a valve housing 51 and a valve actuating pin 52 projects from a stuffing box 53.

In this case, each operating element 104 and 105 is provided with its own heating coil 110, 110$a$ which remains switched on permanently. The capsule 106 of operating element 104 is supported at the cover 128 and the capsule 107 of the operating element 105 is supported at the base 101. Consequently the two tappets 115 and 122 confront each other. They act on the bridge 123 communicating with the servo-plate 116. On the outside of the cap 131 there is a fitting 54 carrying a plurality of plug pins 55 and 56. A socket 57 having a cable connection 58 can be placed on these pins. Current can be supplied by way of this arrangement to the individual heating elements.

The operation of this embodiment corresponds to that of FIG. 1.

Figure 3:
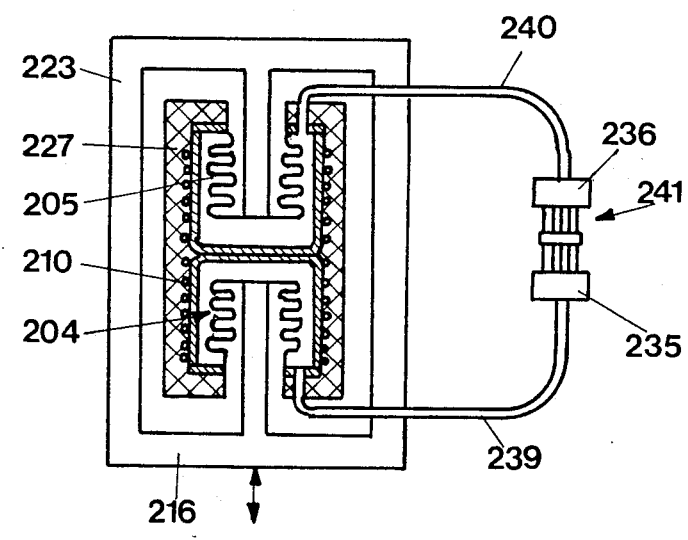
FIG. 3 is a diagrammatic representation of a third embodiment.

In the FIG. 3 embodiment, reference numerals are employed which are higher by 200 than those in FIG. 1. The important difference is that the two containers 235 and 236 are influenced by a thermo-electric heat pump, namely a Peltier element 241, which, when switched on extracts heat from one container and supplies it to the other. By reversing the direction of the current, the flow of heat can also be reversed. In addition, a throughgoing heating coil 210 is placed about the peripheries of both operating elements 204 and 205.

Figure 4:
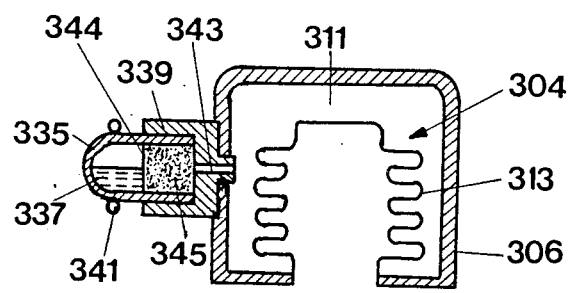
FIG. 4 is a diagrammatic representation of an operating element rigidly connected to the container.

In FIG. 4, corresponding integers are given reference numerals increased by 300 compared with FIG. 1. The container 335 is rigidly connected to the outer capsule 306 of the operating element 304 with the interpositioning of an intermediate member 339 in the form of an insulating block having a bore 343 as a passage. The container comprises a metal hydride filling 337 separated from the passage 343 by a diaphragm 344. This diaphragm is permeable to hydrogen but not to the metal hydride 337. The diaphragm is supported on a plug 345 which, because of its porosity, has a limited permeability. The heating apparatus 341 is indicated as a ring.

After the illustrated liquid-vapour filling or metal hydride filling, a different medium determining the pressure in dependence on the temperature may also be provided in the container, for example an adsorption filling.

It is also possible to provide the two operating elements with bellows elements of different sizes and to arrange the corrugated tubes centrally within each other. In this case two different filling media should be used.

We claim:

1. A thermal valve actuating servomotor, comprising, casing means, valve actuating means, first and second operating elements forming expansible chambers, each said element having fixed and moveable parts with said fixed parts being connected to said casing means and said moveable parts being connected to said valve actuating means, first and second container means attached to said casing means and first and second fluid conduit means connecting said container means respectively to said expansible chambers, a temperature dependent vapour filling in each of said casing means and said chambers, first and second heating means respectively for said container means for respectively thermally influencing said fillings, said container means forming spaces which have relatively small volumes compared to the spaces formed by said expansible chambers.

2. A servomotor according to claim 1 wherein said vapour fillings are accompanied by liquid fillings in said container means, each said liquid filling being of lesser volume than said space formed by the associated one of said container means, said heating means being operable to maintain said container means at lower temperatures than said operating elements.

3. A servomotor according to claim 1 characterized in that each said container space is on the order of 0.2 $cm^3$ and less than 0.5 $cm^3$.

4. A servomotor according to claim 1 characterized in that said container means are subjected to the surrounding air.

5. A servomotor according to claim 1 characterized in that said container means are disposed externally of said casing means and said operating elements are disposed internally of said casing means.

6. A servomotor according to claim 1 characterized in that said heating means comprises two electrical heaters each of which is associated with a respective one of said container means and is individually controllable.

7. A servomotor according to claim 1 characterized in that said heating means comprise a thermo-electric heat pump, with reversible operating directions adapted to cool one of said container means while heating the other of said container means.

8. A servomotor according to claim 7 wherein said heating means comprises a Peltier element.

9. A servomotor according to claim 1 characterized in that both of said heating means are electrically heatable.

10. A servomotor according to claim 1 including thermal insulation surrounding both of said operating elements.

11. A servomotor according to claim 1 including electrical heating means in physical proximity to both of said operating elements.

12. A servomotor according to claim 1 characterized in that said operating elements are in the form of bellows boxes each having an outer capsule with a bellows disposed therein, said capsules are combined to one structural unit with their bases in abutting relation to each other.

13. A servomotor according to claim 1 characterized in that said first and second fluid conduit means comprise capillary tube means.

14. A servomotor according to claim 1 including a block member connected to each of said operating elements having passage means comprising said fluid conduit means and is of a material having a large thermal resistance, one of said container means being connected to said block member.

15. A servomotor according to claim 14 characterized in that said container means comprises a diaphragm which is only permeable to hydrogen and separates passage means from said container space, said filling being a metal hydride.

* * * * *